Figure 1A:
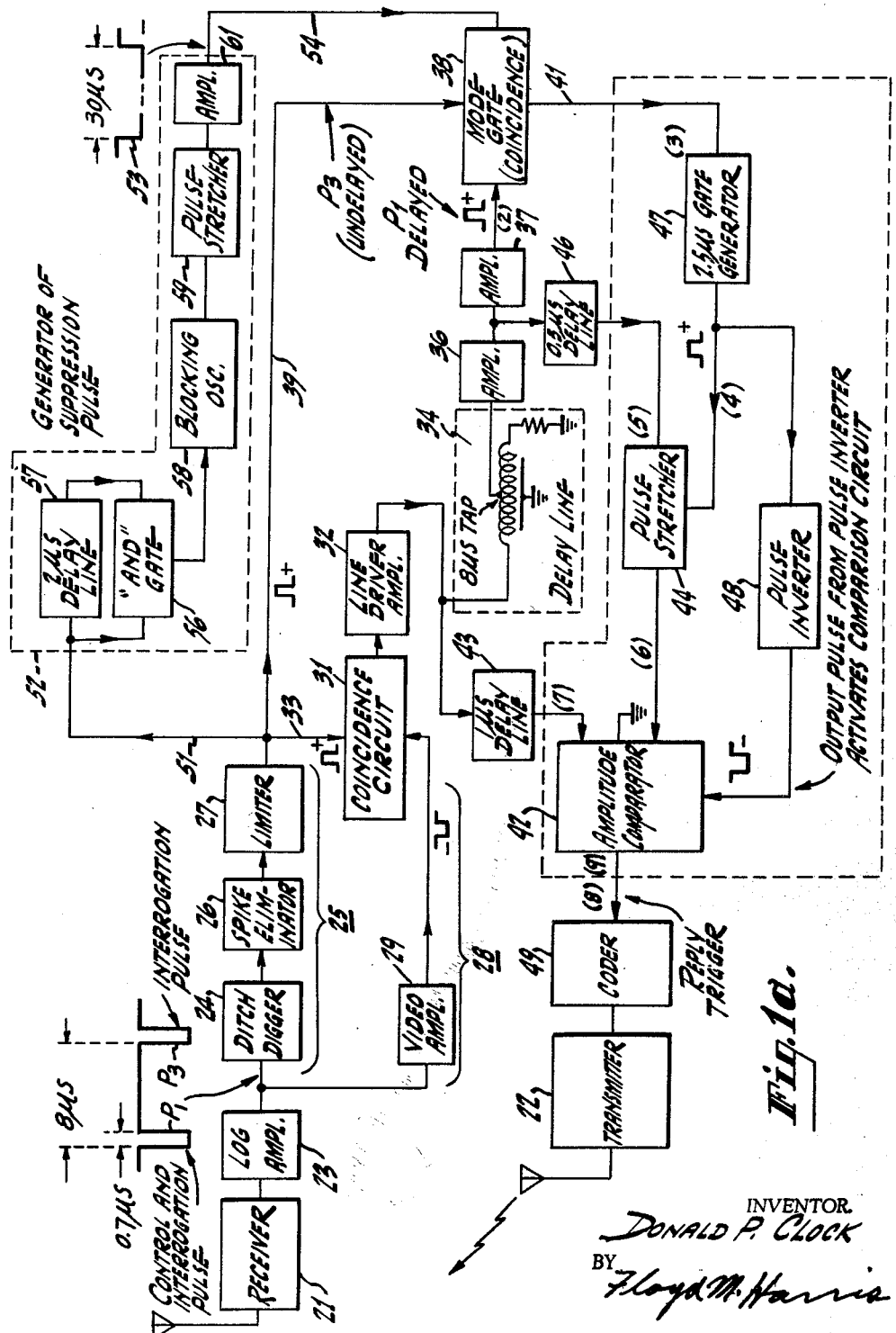

INVENTOR.
DONALD P. CLOCK
BY Floyd M. Harris
ATTORNEY

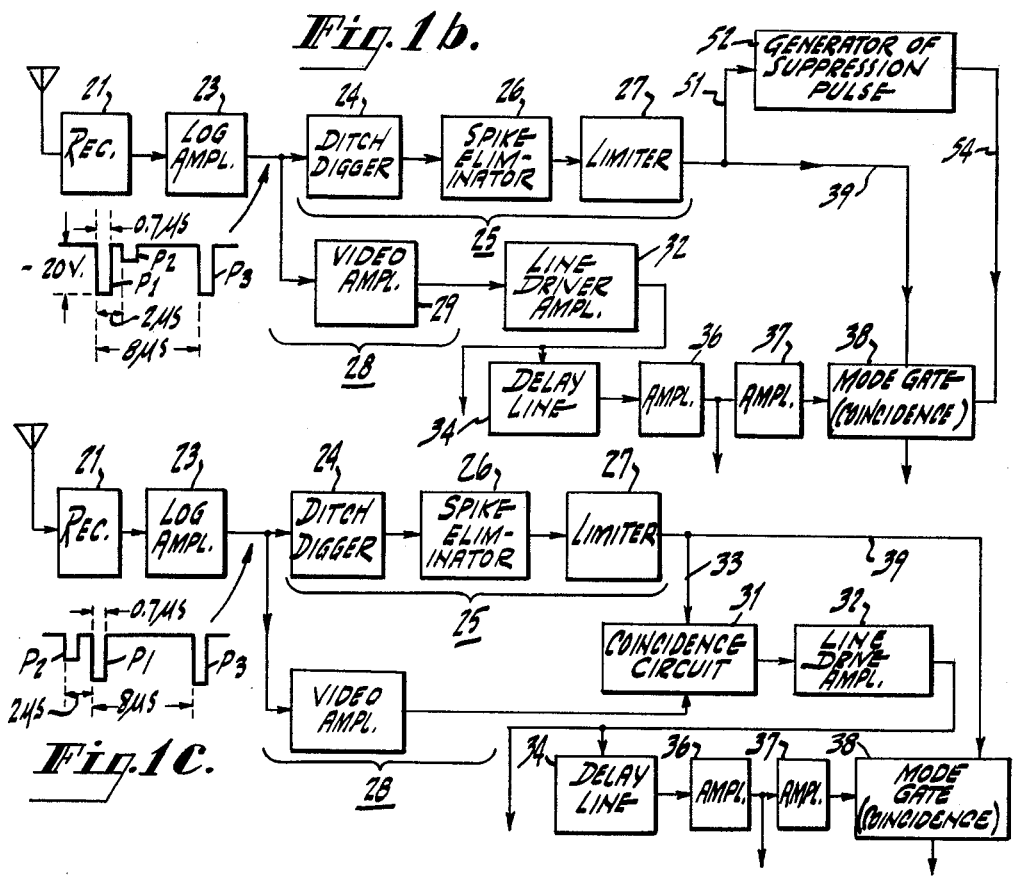
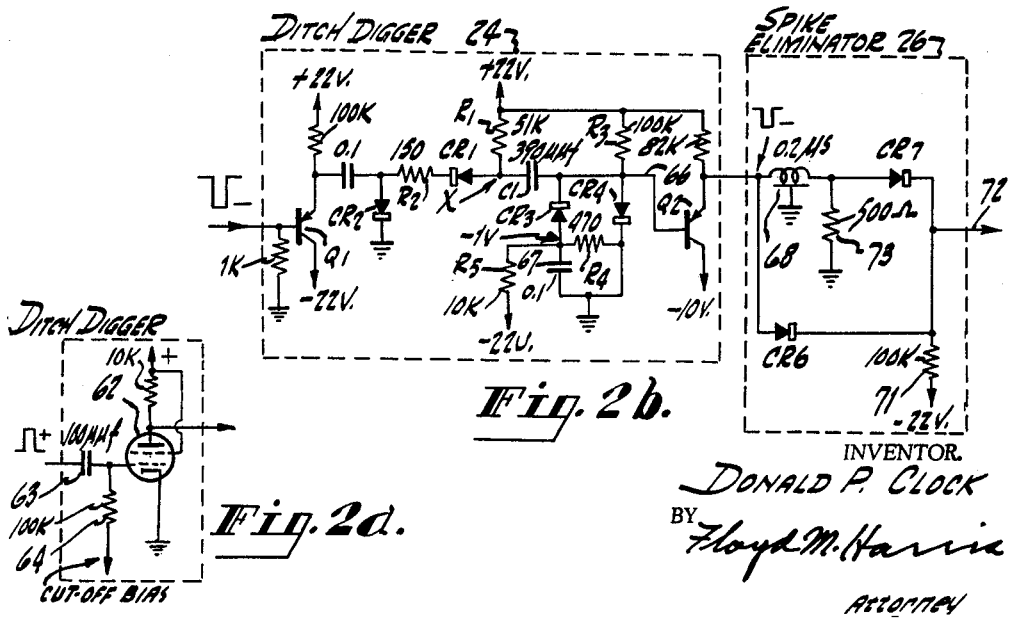

April 13, 1965 D. P. CLOCK 3,178,706
TRANSPONDER DECODER
Filed Nov. 10, 1961 4 Sheets-Sheet 4

INVENTOR.
DONALD P. CLOCK
BY Floyd M. Harris
Attorney

United States Patent Office 3,178,706
Patented Apr. 13, 1965

3,178,706
TRANSPONDER DECODER
Donald P. Clock, Granada Hills, Calif., assignor to Radio Corporation of America, a corporation of Delaware
Filed Nov. 10, 1961, Ser. No. 151,547
9 Claims. (Cl. 343—6.8)

The present invention relates to improved decoders for transponders or the like.

One of the problems in the operation of transponders is caused by the fact that the ground station interrogates an airborne transponder by a rotating directive radio beam which unavoidably has side lobes. Means should be provided so that the transponder will not reply to interrogation by the side lobes. This is referred to as sidelobe suppression. To obtain sidelobe suppression either three-pulse or two-pulse interrogation may be employed. In the case of three-pulse interrogation, two pulses forming a time coded interrogation pair are transmitted on the directional beam, and a control pulse is transmitted on an omni-directional pattern at a signal strength less than that of the main lobe of the directional beam but a little greater than that of the side lobes. This control pulse may be transmitted either just before or just after the first interrogation pulse. In the case of two-pulse interrogation, the first interrogation pulse is transmitted from an omni-directional pattern at about the same strength as the main lobe of the directional pattern. This first pulse functions as the first pulse of the interrogation pair and also as the control pulse for sidelobe suppression. The second pulse of the interrogation pair is transmitted on the directional pattern.

An object of the invention is to provide an improved decoder for decoding either a three-pulse interrogation where one of the pulses is a control pulse or a two-pulse interrogation where one of the pulses functions as both a control pulse and an interrogation pulse.

Another problem in the operation of transponders is that of avoiding replies by the transponder caused by the reception of unwanted signals such as echoes and short noise pulses referred to as spikes. Echoes may be produced, for example, by reflections from the ground, building, or other aircraft.

A further object of the invention is to provide an improved decoder that will be substantially unresponsive to unwanted signals such as echoes and spikes.

A still further object of the invention is to provide an improved decoder that will decode both three pulse interrogations and two pulse interrogations while providing sidelobe suppression, and which also will be substantially unresponsive to unwanted signals such as echoes and spikes.

In accordance with a preferred embodiment of the invention, the received interrogation signal is applied to two parallel channels, one channel including an amplitude comparing means such as a "ditch digger" having an output that is a function of the relative amplitudes of the received pulses, and the other channel (referred to as the parallel channel) passing the interrogation signal without distorting the relative amplitudes of the received pulses. The term "ditch digger" applies to a circuit (a grid leak biased amplifier stage being one example) to which a pulse and a closely following second pulse are to be applied, the first pulse "digging a ditch" (producing a bias) such that the following pulse cannot pass through the circuit if its amplitude is substantially less than that of the first pulse. The output of the parallel channel is applied to an amplitude comparison circuit for comparing the amplitudes of the two interrogation pulses (whether from three pulse or two pulse interrogation) and for producing an output pulse only if the two interrogation pulses have a predetermined amplitude relation. This output pulse will be passed on to a coder to initiate a transponder reply only if a mode gate or coincidence circuit supplies a control or gate pulse, which it will do only if the two interrogation pulses have a certain predetermined time spacing or mode such as eight microseconds, for example.

The parallel circuit, amplitude comparison circuit, and mode gate or coincidence circuit described above are the principal part of the decoder for decoding the two pulse interrogation.

The three pulse decoding, for the case where the control pulse follows the first interrogation pulse, is done by the combined action of the ditch digger, a suppression pulse generator that generates a suppression pulse if the control pulse has sufficient amplitude to pass through the ditch digger, and the amplitude comparison circuit which includes the mode gate or coincidence circuit. The suppresion pulse, if it is generated, in effect blocks passage of the second interrogation pulse so that there is no decoder output to initiate a transponder reply. If no suppression pulse is generated, meaning that no sidelobe suppression is required, there will still be no decoder output unless the two pulses applied to the amplitude comparison circuit have the desired predetermined relative amplitudes. This prevents the transponder from replying to unwanted signals such as echoes.

It is desirable that the output of the parallel channel shall not contain unwanted signals such as spikes and echoes because their presence would tend to produce false triggering of the transponder, making it reply when it has not been interrogated. Therefore, it is advantageous to supply the output of the parallel channel to a coincidence circuit which is controlled by the output of the ditch digger channel. A pulse in the parallel channel will pass through the coincidence circuit only if a pulse from the ditch digger channel is applied simultaneously to the coincidence circuit. Since the ditch digger does not pass low amplitude echoes (and practically all echoes are of low amplitude), the echoes in the parallel channel will not pass through the coincidence circuit. Also, since in the preferred embodiment the ditch digger channel includes a spike eliminator, spikes in the parallel channel will not pass through the coincidence circuit.

For the three-pulse decoding case where the control pulse precedes the first interrogation pulse, the suppression pulse generator may be omitted. In the event of a sidelobe interrogation the control pulse will have an amplitude greater than that of the first interrogation pulse. Therefore, at the ditch digger the control pulse will dig a ditch that prevents the first interrogation pulse from passing. The output of the ditch digger channel gates the coincidence circuit in the parallel channel allowing only the control pulse and the second interrogation pulse to be passed. These pulses do not have the required time spacing, such as an eight microsecond mode spacing assigned to the two interrogation pulses, and there will therefore be no output from the mode coincidence circuit. Thus, no transponder reply will be initiated. If an interfering pulse, such as one from an interrogation on a mode other than the eight microsecond mode to which it is assumed the transponder is set, does occur at such a time as to produce an output from the mode coincidence circuit, the amplitude comparison circuit will usually prevent a transponder reply from being initiated because the interfering pulse and the interrogation pulse of the eight microsecond mode will usually not have the required predetermined amplitude relation. When the required amplitude relation does not exist there will be no output pulse from the amplitude comparison circuit, and no triggering pulse to initiate a transponder reply.

Figure 3:
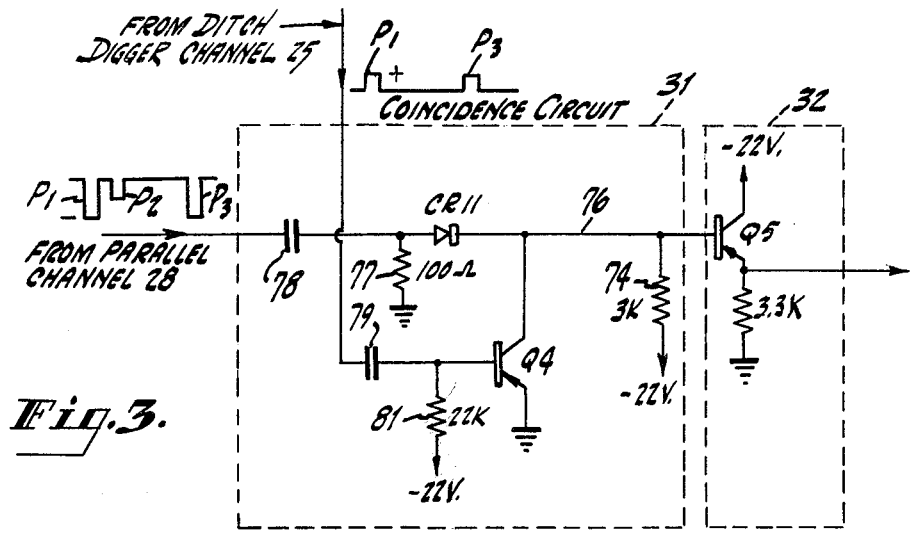
Figure 4:
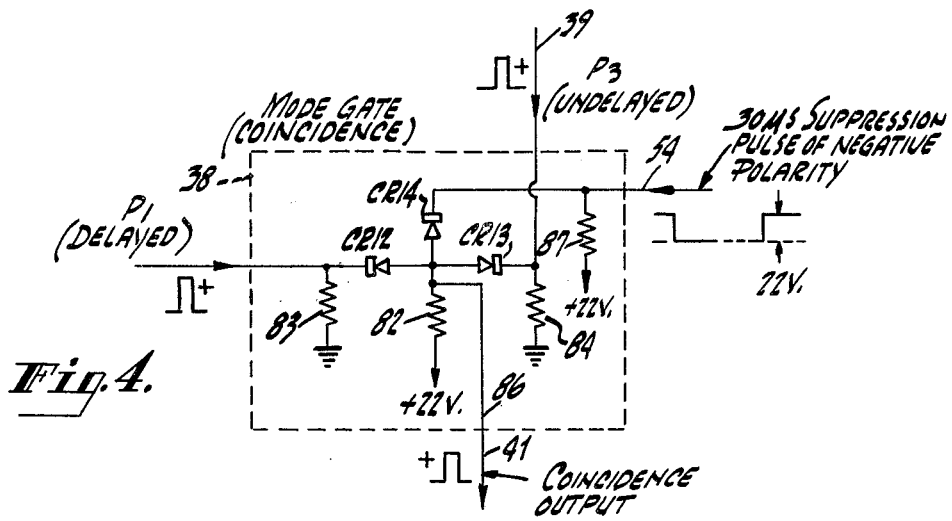

The invention will be described in detail with reference to the accompanying drawing in which:

FIGURE 1a is a block diagram of a transponder that includes on embodiment of the invention, FIGURE 1b is a block diagram of a portion of the transponder shown in FIG. 1a illustrating another embodiment of the invention, FIGURE 1c is another block diagram of a portion of the transponder shown in FIG. 1a illustrating still another embodiment of the invention, FIGURE 2a is a circuit diagram of one type of ditch digger that may be employed in the transponders shown in FIGS. 1a, 1b and 1c, FIGURE 2b is a circuit diagram showing a preferred ditch digger and a suitable spike eliminator that may be employed in the transponders shown in FIGS. 1a, 1b and 1c, FIGURE 3 is a circuit diagram of a suitable coincidence circuit that may be employed in the transponders shown in FIGS. 1a and 1c, FIGURE 4 is a circuit diagram of a mode gate or coincidence circuit that may be employed in the transponders shown in FIGS. 1a, 1b and 1c, FIGURE 5 is a circuit diagram of a pulse stretcher and an amplitude comparator that may be employed in the transponders shown in FIGS. 1a, 1b and 1c, and FIGURE 6 is a group of graphs that are referred to in explaining the operation of the several embodiments of the invention.

In the several figures like parts are indicated by similar reference characters.

FIG. 1a shows an embodiment of the invention as applied to a transponder which comprises a radio receiver 21 that receives the interrogation signal, and a radio transmitter 22 that transmits the reply. The receiver 21 supplies an intermediate frequency signal to a logarithmic amplifier 23 where it is amplified and demodulated to supply video signals to a ditch digger channel 25 that includes a ditch digger 24, a spike eliminator 26 and an amplitude limiter 27. In the specific example being described the output of the logarithmic amplifier 23 is about 0.4 volt per decibel of input signal.

The output of logarithmic amplifier 23 is also supplied to a signal channel 28 which parallels the ditch digger channel 25. Channel 28 is referred to as the parallel channel and is provided to pass the received signal without distorting the relaitve amplitude relation of the pulses. Channel 28 includes a video amplifier 29. In the present example, this amplifier supplies the video signal to a coincidence circuit 31, the output of which is supplied to a line driver amplifier 32. Coincidence circuit 31 is gated by the output pulses from ditch digger channel 25. These pulses are fed to the coincidence circuit through a lead 33. Details of the ditch digger, spike eliminator and coincidence circuit will be described later.

Before further describing the circuit it should be noted that this embodiment of the invention will decode either a two pulse interrogation comprising pulses $P_1$ and $P_3$ as illustrated at the logarithmic amplifier output of FIG. 1a, or a three pulse interrogation (as illustrated in FIG. 1b) which includes a control pulse $P_2$ following interrogation pulse $P_1$, or a three pulse interrogation (as illustrated in FIG. 1c) which includes a control pulse $P_2$ preceding the interrogation pulse $P_1$.

Still referring to FIG. 1a, the output of the line driver 32 is supplied to a tapped delay line 34 which is illustrated as switched to the eight microsecond tap for delaying the signal pulses eight microseconds. The delayed signal is supplied through amplifiers 36 and 37 to a mode gate or mode coincidence circuit 38. The output of the ditch digger channel 25 is also supplied over lead 39 to the mode gate 38. Thus, if an interrogation signal is received in which the interrogation pulses $P_1$ and $P_2$ have an eight microsecond mode spacing, the two pulses will be coincident at the mode gate 38, and a coincidence output pulse will appear on the output lead 41.

Spikes and low amplitude unwanted pulses will not be supplied to the delay line 34 because they do not appear at the output of the ditch digger channel 25 to gate pulses from parallel channel 28 through the coincidence circuit 31. On the other hand, main lobe interrogation pulses $P_1$ and $P_3$ of a two-pulse or a three-pulse interrogation will be gated through. Three-pulse main lobe interrogations are illustrated in FIGS. 1b and 1c.

The lead 39 for supplying undelayed pulses to the mode gate 38 may be connected to the output of line driver 32 instead of to the output of the ditch digger channel 25. However, it is preferred to take the undelayed pulses from the ditch digger channel 25 since these are standardized or amplitude-limited pulses. The use of standardized pulses simplifies the design of the time comparison mode gate 38. It may be desirable in order to obtain more accurate timing or to prevent decoding a single long pulse, to differentiate the limited pulses from lead 39 and use the differentiated front edge of the pulse for the time comparison.

The pulses from the line driver 32, the delayed pulses from amplifier 36, and the output of the mode gate 38 are supplied to a suitable amplitude comparison circuit. This circuit is used to compare the amplitudes of interrogation pulses $P_1$ and $P_3$. It supplies an output pulse only if the two pulses have predetermined relative amplitudes and a predetermined time spacing.

The amplitude comparison circuit comprises an amplitude comparator 42 (one example of which will be described in detail later) to which pulses from the line driver 32 are supplied, preferably through a one microsecond delay line 43. Pulses delayed by the amount of the mode spacing, eight microseconds in this example, are supplied to a pulse stretcher 44 (which will be described in detail later), preferably after being further delayed 0.5 microsecond by a delay line 46. The output of pulse stretcher 44 is a stretched pulse $P_1$ which is supplied to the comparator 42 for comparison with the pulse $P_3$. The purpose of stretching the pulse $P_1$ is to insure that the two pulses will be at their correct individual amplitudes at the time of the comparison.

The pulse stretcher 44 is enabled by a pulse from gating pulse generator 47. Gating pulse generator 47 is triggered by the coincidence output pulse of the mode gate 38. The gating pulse from generator 47 is inverted by a pulse inverter 48 and activates the amplitude comparator 42. Unless a coincidence pulse is produced so that a gating pulse is generated, there can be no output pulse from the amplitude comparator, and no reply trigger—is sent to the coder 49. In the case of two-pulse interrogation, if the interrogation pulses $P_1$ and $P_3$ have the predetermined time spacing and the predetermined relative amplitudes, the amplitude comparator 42 will supply an output pulse to the coder 49 and initiate the generation of a reply code for transmission by the transmitter 22. It will be noted that, since $P_1$ functions also as a control pulse in the case of two pulse interrogation, $P_1$ being transmitted from the interrogating station by an omni-directional pattern, the time and amplitude comparison action described above provides sidelobe suppression.

In the case of three-pulse interrogations where the control pulse is a third pulse $P_2$ as shown in either FIG. 1b or in FIG. 1c, the ditch digger 24 is employed for sidelobe suppression. For main lobe interrogations of either three-pulse type, the operation of the decoder will be the same as described above for the two pulse interrogation. However, in the case of three-pulse sidelobe interrogations the control pulse $P_2$ will have an amplitude equal to or greater than that of $P_1$. When this condition exists the ditch digger 24 prevents the transponder from replying as described below.

Assume that there is a sidelobe interrogation with a three-pulse interrogation of the type where $P_2$ follows $P_1$ (FIG. 1b). Now the ditch dug by $P_1$ in the ditch digger 24 does not prevent the large amplitude pulse $P_2$ from passing through the ditch digger channel, therefore both $P_1$ and $P_2$ appear in its output. The ditch digger channel output including $P_1$ and $P_2$ is supplied over a lead 51 to a suppression pulse generator 52 which generates a suppression pulse 53 of a comparatively long duration such as thirty microseconds. This suppression pulse is supplied over a lead 54 to the mode gate 34 where it prevents the mode gate from supplying a coincidence pulse to the lead 41. Thus the amplitude comparator is not activated, and no reply trigger is sent to the coder.

The suppression pulse generator 52, shown in FIG. 1a, comprises a coincidence circuit or "and" gate 56 to which both delayed and undelayed pulses are applied. The delayed pulses are delayed two microseconds by a delay circuit 57, this delay being the time spacing of pulses $P_1$ and $P_2$. Therefore, the presence of both $P_1$ and $P_2$ will result in an "and" gate output pulse that initiates the generation of the suppression pulse 53. To generate pulse 53 the "and" gate output pulse may trigger a blocking oscillator 58 which produces an output pulse that is stretched by a suitable pulse stretcher 59 and amplified by an amplifier 61.

Sidelobe suppression will now be described for the case where the interrogation is of the three-pulse type with the control pulse $P_2$ preceding the interrogation pulse $P_1$ (FIG. 1c). Since sidelobe interrogation is assumed, the amplitude of control pulse $P_2$ will be about the same as, or greater than, that of $P_1$. Under this condition $P_2$ will dig a ditch at the ditch digger 24 that will not let $P_1$ pass. Consequently, only pulses $P_2$ and $P_3$ will gate coincidence circuit 31 open and only control pulse $P_2$ and interrogation pulse $P_3$ will be passed from the parallel channel 28 to the line driver 32. It is evident that there can be no output from the mode gate 38 because the pulses $P_2$ and $P_3$ do not have the eight microsecond mode spacing for which the decoder is set. Therefore, there can be no activation of the amplitude comparator, and no reply trigger will be sent to the coder 49.

As illustrated by the block diagram of FIG. 1b, gating of the parallel channel 28 by the ditch digger channel 25 may be omitted from the decoder shown in FIG. 1a, if the interrogation is to be of the two-pulse type or of the three-pulse type where $P_2$ follows $P_1$, and is not to be of the three-pulse type where $P_2$ precedes $P_1$ (as illustrated in FIG. 1c). Therefore, in the embodiment of FIG. 1b the coincidence circuit 31 is omitted, the decoder otherwise being as shown in FIG. 1a. Since in the decoder of FIG. 1b the low-amplitude signals such as echoes will be supplied to the delay line 34 by the parallel channel 28 along with the desired signals, this decoder may be more subject to false triggering than the decoder of FIG. 1a that utilizes gating of the parallel channel 28 by the ditch digger channel 25. Therefore, the decoder of FIG. 1a is preferred.

FIG. 1c illustrates an embodiment of the invention that is the same as shown in FIG. 1a except that the suppression pulse generator 52 is omitted. The FIG. 1c embodiment is suitable if the interrogation is to be of the two-pulse type or of the three-pulse type where $P_2$ precedes $P_1$ (as illustrated in FIG. 1c), and is not to be of the three-pulse type where $P_2$ follows $P_1$ (as illustrated in FIG. 1b). As previously stated, in the case of a three-pulse sidelobe interrogation of the type illustrated in FIG. 1c, $P_2$ will have an amplitude about as large or larger than that of $P_1$. $P_2$ then digs a ditch at ditch digger 24 for $P_1$ so that $P_1$ fails to appear in the output of the ditch digger channel 25. Only $P_2$ and $P_3$ will be gated through the coincidence circuit 21, and there can be no output from the mode gate 38. Therefore, the transponder will not reply to the sidelobe interrogation.

The circuit details of various units in the decoder will now be described under appropriate headings.

Ditch digger

The ditch digger 24 may be of a well-known design such as shown in FIG. 2a. The interrogation signal is applied to this ditch digger with the pulses of positive polarity. They produce a flow of grid current in the vacuum tube 62 which quickly charges the grid capacitor 63. Capacitor 63 discharges compartively slowly through the grid leak resistor 64, the discharge time constant being about ten microseconds, for example. Therefore, a low amplitude pulse immediately following a compartively high amplitude pulse will not be passed by the tube 62. For example, referring to the three pulse interrogation illustrated in FIG. 1b, the pulse $P_1$ digs a ditch so that the low amplitude control pulse $P_2$ is not passed.

A preferred ditch digger is shown in FIG. 2b. This is the one that preferably is incorporated in the decoders shown in FIGS. 1a, 1b and 1c. In the example shown, it is designed to receive negative pulses. Also, in the following description of its operation it is assumed that the interrogation signal is of the type illustrated in FIG. 1b where the control pulse $P_2$ follows the interrogation pulse $P_1$.

Referring to FIG. 2b, the ditch digger comprises diodes CR1, CR3, CR4, capacitor C1, resistors R1 and R3, and a biasing voltage divider R4, R5. The ditch digger is driven from a low impedance source at ground reference. Specifically, it is driven from emitter follower transistor Q1 through a coupling capacitor and resistor R2. Diode CR2 clamps to ground the base of the negative pulses supplied by Q1. The ditch digger output appears on an output lead 66 and is applied to the base of a transistor Q2.

In the absence of applied pulses, output lead 66 is kept at ground potential by the diode CR4 which is conducting because of plus 22 volts applied through the resistor R3. Diode CR3 is back biased by minus 1 volt from the voltage divider R4, R5. A capacitor 67 bypasses the voltage divider.

When a negative pulse is applied to the input (such as interrogation pulse $P_1$), it passes through diode CR1, and carries the point $x$ and the output lead 66 negative until an amplitude of minus 1 volt is reached. At that potential CR3 conducts and holds lead 66 at minus 1 volt. Meanwhile diode CR4 has been made non-conducting since its anode has become negative with respect to ground.

As soon as the amplitude of the applied pulse exceeds 1 volt, capacitor C1 begins to charge through CR3, CR1 and R2. If the diode impedance, which is small, is neglected, the charging time constant is the capacity of C1 times the resistance of R2 or about 0.06 microsecond. Therefore, C1 charges completely during the pulse.

As the amplitude of the applied pulse decreases (the pulse now starting to go less negative or in the positive direction), diode CR3 immediately cuts off and diode CR4 remains non-conducting until the amplitude decreases more than one volt. Thus, at the beginning of the trailing edge point $x$ starts to go in the positive direction (CR1 remaining conducting) and output lead 66 follows until the applied pulse, point $x$ and lead 66 have decreased 1 volt. As the pulse decreases further, diode CR4 conducts.

Once CR4 conducts, point $x$ can go no further in the positive direction until capacitor C1 discharges, so CR1 immediately cuts off. Then the discharge path for C1 is through CR4 and R1. If no other input pulse appears, C1 discharges completely allowing point $x$ to return to nearly ground potential in about 15 microseconds, point $x$ being clamped to slightly above ground potential by the conducting circuit CR1, R2 and CR2 fed by plus 22 volts through R1. The discharge time may be set at some other value depending on how much dead time the transponder system can withstand. Since R1 is returned to +22 volts, the discharge of C1 is nearly linear instead of exponential as would be the case with the circuit of FIG. 2a. A linear discharge makes the amplitude comparison independent of the pulse amplitudes.

From the foregoing description of the circuit operation resulting when a pulse such as $P_1$ is received, it will be seen that reception of pulse $P_1$ causes a one volt output pulse to be applied to the base of Q2 which supplies the output pulse to the spike eliminator.

It may be noted that the leading edge of the output pulse is always the first volt after diode CR1 conducts. The trailing edge of the output pulse corresponds to the first volt of the input pulse trailing edge. The timing relation of the output pulse leading edge to the input pulse leading edge is a function of the state of charge of the capacitor C1. If capacitor C1 has no charge, the output pulse leading edge is the first volt of the input pulse. If C1 has not completely discharged, the leading edge of the output pulse can be anywhere on the leading edge of the input pulse, depending upon the charge on C1 at the time the pulse appears and the relative amplitude of the pulse.

From the foregoing description of the ditch digger operation, it will be apparent that the control pulse $P_2$, occurring about 1 microsecond after the interrogation pulse $P_1$, cannot pass through the ditch digger if its amplitude is substantially less than that of $P_1$ because C1 has discharged only slightly, which maintains the voltage at point $x$ to nearly the peak voltage of the pulse $P_1$, and the voltage of the second pulse $P_2$ must be larger than the voltage at point $x$ before diode CR1 will conduct. On the other hand, if $P_2$ is about equal in amplitude to $P_1$, or exceeds it in amplitude, $P_2$ will be passed along with $P_1$ and a suppression pulse will be generated, as described in connection with FIGS. 1$a$ and 1$b$, so that the transponder will not respond to sidelobe interrogation.

The interrogation pulse $P_3$ will always be passed by the ditch digger because its amplitude is always approximately the same as that of $P_1$, and also because the capacitor C1 has had time to discharge a substantial amount by the time $P_3$ occurs.

Resistor and capacitor values are indicated for the ditch diggers merely by way of example. They are indicated in ohms, thousands of ohms and microfarads except in the case of capacitors 63 and C1 which are indicated in micro-microfarads.

*Spike eliminator*

A suitable circuit for the spike eliminator 26 is shown in FIG. 2$b$. It receives negative polarity pulses from the ditch digger 24 and is designed to eliminate narrow pulses such as noise pulses or spikes of 0.2 microsecond duration or less. Pulses wider than 0.2 microsecond will be passed. The spike eliminator comprises a 0.2 microsecond delay line 68 and a diode "AND" circuit. The "AND" circuit comprises a diode CR6 which has its anode connected to the input of the delay line and a diode CR7 which has its anode connected to the output of the delay line. The cathodes of CR6 and CR7 are connected through a resistor 71 to a minus 22 volt source. An output lead 72 is taken from the cathode end of resistor 71. Lead 72, in one embodiment, connects to the base of a transistor emitter follower (not shown).

The delay line 68 has a non-reflecting termination that is provided by a resistor 73 connected from the output end of the delay line to ground. This provides a low impedance for one input to the "AND" circuit. The transistor Q2 provides a low impedance for the other input to the "AND" circuit.

In the absence of an applied signal, the diodes CR6 and CR7 are conducting so that the output-lead end of resistor 71 is only slightly above ground potential. Note that the input lead to the spike eliminator is at substantially ground potential since the base of Q2 is clamped at substantially ground potential by diode CR4. If a pulse of 0.2 microsecond duration or less is applied to the spike eliminator, the negative pulse will be applied first to CR6 and then to CR7, but not to both at the same time. Therefore, one of the two diodes is always conducting so that the output lead end of resistor 71 is always held at substantially ground potential by way of one of the diodes.

If a pulse wider than 0.2 microsecond is applied to the spike eliminator, there will be a pulse overlap in time so that a portion of the pulse will appear simultaneously at CR6 and CR7 to cut off or block both of the diodes. Thus, the output-lead end of resistor 71 can follow the amplitude of the negative input pulse so that an output pulse is produced. Note that the output-lead end of resistor 71 follows the potential of the pulse applied to a diode (unless held at ground through the other diode) since the resistance at the diode input is low compared with the resistance of resistor 71 through which the forward bias voltage is applied. For example, referring to diode CR7, the resistance of resistor 73 is 500 ohms as compared with a 100,000 ohm resistance for resistor 71.

Resistor and capacitor values are indicated for the spike eliminator merely by way of example. They are indicated in ohms, in thousands of ohms and in microfarads.

*Coincidence circuit*

A suitable circuit for the coincidence circuit 31 is shown in FIG. 3. It comprises a diode CR11 that is connected in the conducting direction to a minus 22 volt source. This 22 volt source is applied to the cathode of the CR11 through a resistor 74 and a lead 76. The conducting circuit through CR11 is completed by an input resistor 77 connected between the anode of CR11 and ground.

A normally conducting transistor Q4 normally holds the lead 76 at substantially ground potential. The collector of Q4 is connected to the lead 76, and thus to minus 22 volts through resistor 74. The emitter is connected to ground. The base of Q4, to which the ditch digger channel output is applied through a blocking capacitor 79, has minus 22 volts applied to it through a resistor 81.

In the absence of a pulse from the ditch digger channel 25, transistor Q4 is conducting to hold lead 76 at ground potential. It is evident, therefore, that normally the pulses from the parallel channel 28 applied through a blocking capacitor 78 to diode CR11 cannot be passed on to the line driver 32.

Pulses from the ditch digger channel 25, which are of positive polarity, will drive Q4 to non-conducting condition, thereby breaking the connection holding lead 76 at ground potential. Therefore, the lead 76 can follow the pulse amplitude appearing at the anode end of input resistor 77. To take a specific example illustrated in FIG. 3, pulses $P_1$ and $P_3$ appear in the ditch digger channel output and are applied to Q4 simultaneously with the application of pulses $P_1$ and $P_3$ to diode CR11 from the parallel channel 28. Therefore the coincidence circuit passes $P_1$ and $P_3$ from the parallel channel with their relative amplitudes preserved. The pulse $P_2$ from the parallel channel is not passed because at the instant that it occurs Q4 is conducting and lead 76 is being held at ground potential.

With respect to the line driver transistor Q5, it will be noted that a small negative potential is on the base due to the relatively small resistance of resistor 77 as compared with that of resistor 74.

Resistor values are indicated for the coincidence circuit merely by way of example. They are indicated in ohms and thousands of ohms.

*Mode gate*

The mode gate 38 is an "AND" gate or coincidence circuit which, as used in FIGS. 1$a$ and 1$b$, is provided with means for blocking the output upon application of a suppression pulse. A suitable circuit for the mode gate is shown in FIG. 4. The "AND" gate comprises diodes CR12 and CR13 which are forward biased to be normally conducting by a plus 22 volt source applied to the anodes of both diodes through a resistor 82. The conducting circuit for diode CR12 is completed by a low impedance input, resistor 83. It is completed for diode CR13 by a low impedance input, resistor 84.

The mode gate output appears on a lead 86 connected to the junction point of the diodes and resistor 82. This point has a potential near ground due to the voltage drop in resistor 82 if either CR12 or CR13 is conducting, the condition for no output. If positive pulses are applied simultaneously to the cathodes of diodes CR12 and CR13, the diodes are driven to non-conducting condition, and the voltage on output lead 87 rises to the value of the pulse, thus supplying an output pulse.

Referring now to the action of a suppression pulse, it is applied over the lead 54 and through a diode CR14 to the junction point of diodes CR12 and CR13 and resistor 82.

The diode CR14 is normally held non-conducting by a plus 22 volt source applied through a resistor 87 so that, in the absence of a suppression pulse, it has no effect on the "AND" gate. The application of a 22 volt negative suppression pulse, however, produces a flow of current through the diode CR14 and resistor 82, thereby holding the potential at the output lead 86 to a value near ground. Thus, there can be no "AND" gate output.

Amplitude comparator

Figure 6:
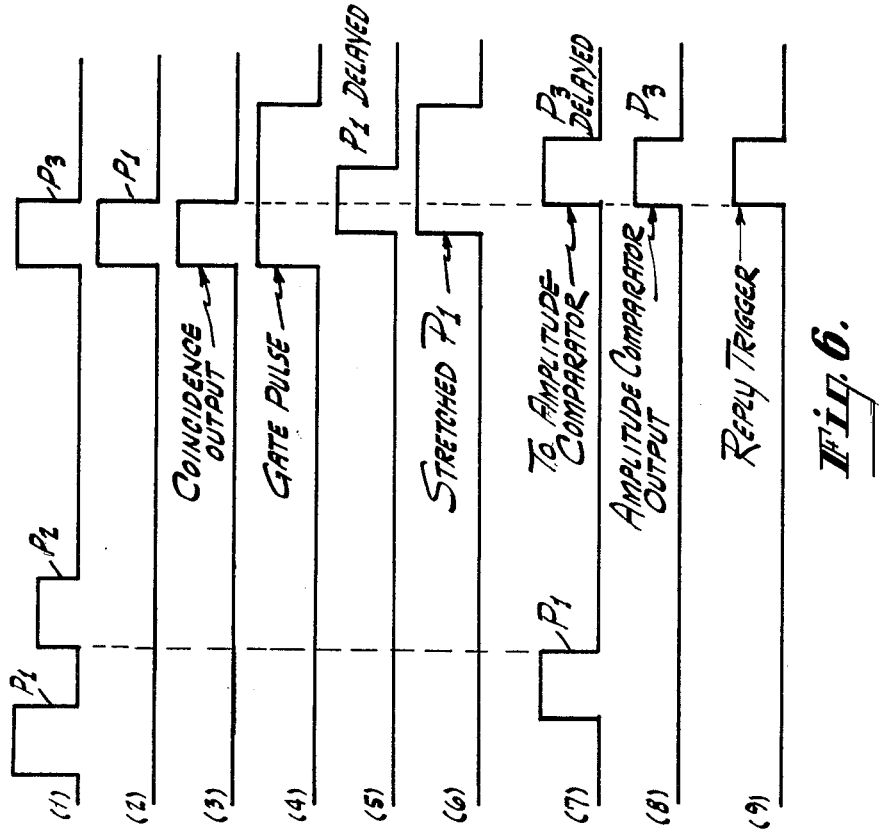
Figure 5:
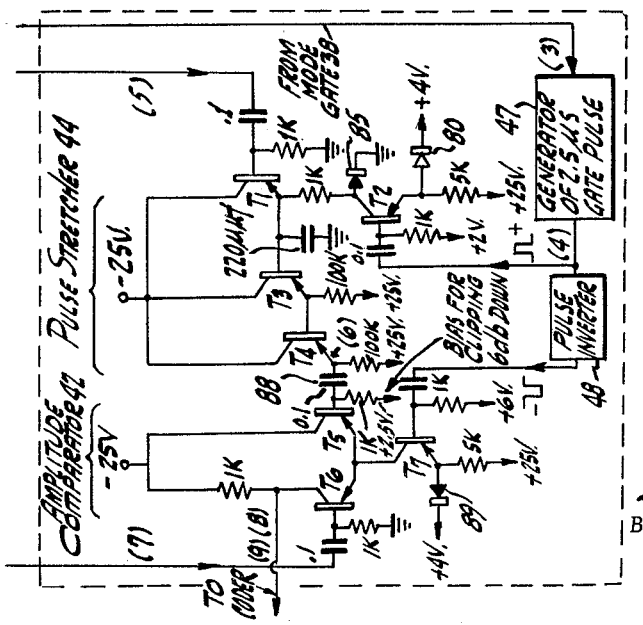

Referring to FIGS. 5 and 6, a suitable amplitude comparator will now be described in detail together with a description of its operation. In FIG. 5 capacitor and resistor values are given merely as illustrative. The capacity values are in microfarads unless otherwise indicated. The resistor values are in thousands of ohms. Thus a 1K resistor is a 1000 ohm resistor. FIG. 6 shows the voltage wave forms or signals (1) through (9) that appear at various points in the circuit of FIG. 5, and also in the block diagram of FIG. 1a. The points at which they appear in the figures are indicated by numerals in parentheses corresponding to those identifying the signals in FIG. 6.

The pulse stretcher 44 comprises a transistor T1 to the base of which the pulse $P_1$, signal (5), is applied. In order to stretch the pulse, a 220 micro-microfarad capacitor is connected between the emitter of T1 and ground. The emitter circuit also includes a transistor T2 which is normally conducting to discharge the 220 $\mu\mu f$. capacitor. However, transistor T2 becomes non-conducting for the duration of the gate pulse (4) since the gating pulse is applied with positive polarity to the base of T2. A diode 80 is connected between the emitter of T2 and plus 4 volts so that the emitter is clamped to plus 4 volts as the emitter goes toward plus 25 volts because of decreasing transistor current upon application of the gating pulse, thus making possible the use of a smaller amplitude gating pulse. Thus, the stretcher is enabled so that when $P_1$ appears an instant later at the base of T1, the 220 $\mu\mu f$. capacitor is charged to full pulse voltage, and it holds this charge until the termination of the gate pulse (4). Thus, the stretched pulse $P_1$ is obtained. When T2 is conducting, the diode 85 holds the collector at ground so that the current through T2 will be supplied by the diode instead of through the transistor T1.

Stretched pulse $P_1$, signal (6), is passed through isolating emitter follower transistors T3 and T4, and through a coupling capacitor 88 to the amplitude comparator 42.

The amplitude comparator is a difference amplifier comprising transistors T5 and T6, and a transistor T7 that is common to their emitter circuits. Transistor T7 is normally held cut off to hold the comparator inactive. It is made conducting for the duration of each gating pulse to produce a constant current source for the difference amplifier, thus activating the comparator.

The amplitude comparator 42 is biased in one direction by a voltage equivalent to 6 db. The primary reason for this is to allow the acceptance of pulses $P_3$ when it is about 6 db below pulse $P_1$, referring to pulse amplitudes at the log amplifier input. A secondary reason is to preserve the timing information of the pulses.

In this example, the 6 db bias is 2.5 volts positive applied to the base of transistor T5 along with the stretched pulse $P_1$. Pulse $P_3$, signal (7), is applied to the base of transistor T6. Thus, for equal-amplitude input pulses, the instantaneous voltages at the bases of T5 and T6 are equal when the 6 db down amplitude of pulse $P_3$ is equal to the peak amplitude of stretched pulse $P_1$. When the amplitude of $P_3$ equals the amplitude of clipped $P_1$ (referring to the pulses as received by the transponder), the output signal (8) appears at the collector of T6 at a time corresponding to the 6 db down point on $P_3$ and is applied to the coder if the comparator is activated. If $P_3$ is more than 6 db below the amplitude of $P_1$, no output (8) occurs. Since the theory of operation of difference amplifiers is well known, no detailed description of operation is required. However, it may be noted that the common emitter potential is established by the most negative of the two base potentials. The transistor with the most negative base potential is the one that conducts. The amplitude comparator 42 is normally inactive and is gated into active or operative condition by the 2.5 microsecond gate pulse. The gate signal (4) from gate generator 47 is inverted by pulse inverter 48 which applies a negative gating pulse to the amplitude comparator 42. The transistor T7 of the amplitude comparator normally is held cut off by suitable biasing. In the example shown, the base of T7 is biased at plus 6 volts, and plus 4 volts for clamping is connected to the emitter through a diode 89. When the negative 2.5 microsecond gating pulse occurs, T7 is turned on and the amplitude comparator 42 is rendered operative for the duration of the gating pulse. If the amplitude of $P_3$ is not more than 6 db below the amplitude of $P_1$ (referring to amplitudes of transponder received pulses), the output signal (8) appears at the collector of T6. This output signal (8) in this embodiment is also the reply trigger (9). The two pulses $P_1$ and $P_3$ must have both the correct code spacing and the correct relative amplitudes before a reply trigger is produced.

What is claimed is:

1. Decoding apparatus that is responsive to either a two-pulse interrogation or a three-pulse interrogation, said two-pulse interrogation comprising a pair of pulses having a predetermined time spacing, each of said pulses of the pair being an interrogation pulse and one of said pulses of the pair also being a sidelobe suppression pulse, said three-pulse interrogation comprising three pulses $P_1$, $P_2$ and $P_3$ having a predetermined time spacing and having a predetermined amplitude relation, the pulses $P_1$ and $P_3$ being interrogation pulses having the same time spacing as the pair of pulses of the two-pulse interrogation, the pulse $P_2$ being a sidelobe suppression pulse that is spaced close to pulse $P_1$, said decoding apparatus comprising a pair of parallel channels, means for applying received interrogation pulses to said channels, one of said channels including an amplitude comparison means for preventing the second occurring one of the pulses $P_1$ and $P_2$ from being passed if its amplitude is less than that of the first occurring of the pulses $P_1$ and $P_2$ by a predetermined amount and whereby the output pulses of said one channel are distorted with respect to their original relative amplitudes, the second of said channels being non-distorting with respect to the relative amplitudes of said pulses; an amplitude comparison circuit to which the output pulses of said second channel are applied, said amplitude comparison circuit comprising means for comparing the amplitudes of said interrogation pulses for producing an output pulse when said interrogation pulses have a predetermined amplitude relation, means for producing a coincidence output pulse in response to the interrogation pulses of an interrogation having a predetermined time spacing, said decoding apparatus having an output lead, and means for supplying the output of said amplitude comparison circuit to said output lead in response to the occurrence of said coincidence output pulse.

2. Decoding apparatus that is responsive to either a two-pulse interrogation or a three-pulse interrogation, said two-pulse interrogation comprising a pair of pulses having a predetermined time spacing, each of said pulses of the pair being an interrogation pulse and one of said pulses of the pair also being a sidelobe suppression pulse, said three-pulse interrogation comprising three pulses $P_1$, $P_2$ and $P_3$ having a predetermined time spacing and having a predetermined amplitude relation, the pulses $P_1$ and $P_3$ being interrogation pulses having the same time spacing as the pair of pulses of the two-pulse interrogation, the pulse $P_2$ being a sidelobe suppression pulse that is spaced close to the pulse $P_1$, said decoding apparatus comprising a pair of parallel channels, means for applying received interrogation pulses to said channels, one of said channels including an amplitude comparison means for preventing the second occurring one of the pulses $P_1$ and $P_2$ from being passed if its amplitude is less than that of the first occurring of the pulses $P_1$ and $P_2$ by a predetermined amount and whereby the output pulses of said one channel are distorted with respect to their original relative amplitudes, the second of said channels being nondistorting with respect to the relative amplitudes of said pulses; an amplitude comparison circuit to which the output pulses of said second channel are applied, said amplitude comparison circuit comprising means for comparing the amplitudes of said interrogation pulses for producing an output pulse when said interrogation pulses have a predetermined amplitude relation; mode gate means for producing a coincidence output pulse in response to the interrogation pulses of an interrogation having a predetermined time spacing, said decoding apparatus having an output lead, means for supplying the output of said amplitude comparison circuit to said output lead in response to the occurrence of said coincidence output pulse; a suppression pulse generator to which the output of said one channel is applied, said generator including means for producing a suppression pulse when pulses $P_1$ and $P_2$ are supplied thereto with a predetermined time spacing, and means responsive to the production of said suppression pulse for preventing the output of said amplitude comparison circuit from being supplied to said output lead.

3. Decoding apparatus that is responsive to either a two-pulse interrogation or a three-pulse interrogation, said two-pulse interrogation comprising a pair of pulses having a predetermined time spacing, each of said pulses of the pair being an interrogation pulse and one of said pulses of the pair also being a sidelobe suppression pulse, said three-pulse interrogation comprising three pulses $P_1$, $P_2$ and $P_3$ having a predetermined time spacing and having a predetermined amplitude relation, the pulse $P_2$ being a sidelobe suppression pulse that is spaced close to pulse $P_1$, said decoding apparatus comprising a pair of parallel channels, means for applying received interrogation pulses to said channels, one of said channels including an amplitude comparison means for preventing the second occurring one of the pulses $P_1$ and $P_2$ from being passed if its amplitude is less than that of the first occurring of the pulses $P_1$ and $P_2$ by a predetermined amount and whereby the output pulses of said one channel are distorted with respect to their original relative amplitudes, the second of said channels being non-distorting with respect to the relative amplitudes of said pulses, a coincidence gate having two input circuits and having an output circuit, and means for supplying the outputs of said two channels to the two input circuits, respectively, of said coincidence gate whereby pulses from said second channel appear in said gate output circuit when and only when corresponding pulses are supplied simultaneously to said coincidence gate from said one channel, an amplitude comparison circuit to which the pulses from said gate output circuit are applied said amplitude comparison circuit comprising means for comparing the amplitudes of said interrogation pulses for producing an output pulse when said interrogation pulses have a predetermined amplitude relation, mode gate means for producing a coincidence output pulse in response to the interrogation pulses of an interrogation having a predetermined time spacing, said decoding apparatus having an output lead, and means for supplying the output of said amplitude comparison circuit to said output lead in response to the occurrence of said coincidence output pulse.

4. Decoding apparatus that is responsive to either a two-pulse interrogation or a three-pulse interrogation, said two-pulse interrogation comprising a pair of pulses having a predetermined time spacing, each of said pulses of the pair being an interrogation pulse and one of said pulses of the pair also being a sidelobe suppression pulse, said three-pulse interrogation comprising three pulses $P_1$, $P_2$ and $P_3$ having a predetermined time spacing and having a predetermined amplitude relation, the pulses $P_1$ and $P_3$ being interrogation pulses having the same time spacing as the pair of pulses of the two-pulse interrogation, the pulse $P_2$ being a sidelobe suppression pulse that is spaced close to pulse $P_1$, said decoding apparatus comprising a pair of parallel channels, means for applying received interrogation pulses to said channels, one of said channels including an amplitude comparison means for preventing the second occurring one of the pulses $P_1$ and $P_2$ from being passed if its amplitude is less than that of the first occuring of the pulses $P_1$ and $P_2$ by a predetermined amount and whereby the output pulses of said one channel are distorted with respect to their original relative amplitudes, the second of said channels being non-distorting with respect to the relative amplitudes of said pulses, a coincidence gate having two input circuits and having an output circuit, means for supplying the outputs of said two channels to the two input circuits, respectively, of said coincidence gate whereby pulses from said second channel appear in said gate output circuit when and only when corresponding pulses are supplied simultaneously to said coincidence gate from said one channel, an amplitude comparison circuit to which the pulses from said gate output circuit are applied, said amplitude comparison circuit comprising means for comparing the amplitudes of said interrogation pulses for producing an output pulse when said interrogation pulses have a predetermined amplitude relation, mode gate means for producing a coincidence output pulse in response to the interrogation pulses of an interrogation having a predetermined time spacing, said decoding apparatus having an output lead, means for supplying the output of said amplitude comparison circuit to said output lead in response to the occurrence of said coincidence output pulse, a suppression pulse generator to which the output of said one channel is applied, said generator including means for producing a suppression pulse when pulses $P_1$ and $P_2$ are supplied thereto with a predetermined time spacing, and means responsive to the production of said suppression pulse for preventing the output of said amplitude comparison circuit from being supplied to said output lead.

5. Decoding apparatus that is responsive to either a two-pulse interrogation or a three-pulse interrogation, said two-pulse interrogation comprising a pair of pulses having a predetermined time spacing, each of said pulses of the pair being an interrogation pulse and one of said pulses of the pair also being a sidelobe suppression pulse, said three-pulse interrogation comprising a sidelobe suppression pulse and two interrogation pulses having predetermined time spacings, the interrogation pulses of said three-pulse interrogation having the same time spacing as said pair of pulses of the two-pulse interrogation, said decoding apparatus comprising a pair of parallel channels, means for applying received interrogation pulses to said channels, one of said channels including an amplitude comparison circuit of the ditch digging type whereby the output pulses of said one channel are distorted with respect to their original relative amplitudes, the second of said channels being non-distorting with respect to the relative amplitudes of said pulses, an amplitude comparison circuit to which the output pulses of said second channel are applied, said last mentioned amplitude comparison circuit comprising means for comparing the amplitudes of said interrogation pulses for producing an output pulse when said pulses have a predetermined amplitude relation, means for producing a coincidence output pulse when said interrogation pulses have a predetermined time spacing, said decoding apparatus having an output lead, means for normally supplying the output of said last mentioned amplitude comparison circuit to said output lead in response to the occurrence of said coincidence output pulse, a suppression pulse generator to which the output of said one channel is applied, said generator including means for producing a suppression pulse when both the sidelobe suppression pulse and the first occurring interrogation pulse of the three-pulse interrogation are supplied thereto with a predetermined time spacing, and means responsive to the production of said suppression pulse for preventing the output of said last mentioned amplitude comparison circuit from being supplied to said output lead.

6. Decoding apparatus that is responsive to either a two-pulse interrogation or a three-pulse interrogation, said two-pulse interrogation comprising a pair of pulses having a predetermined time spacing each of said pulses being an interrogation pulse and one of said pulses also being a sidelobe suppression pulse, said three-pulse interrogation comprising three pulses $P_1$, $P_2$ and $P_3$ having a predetermined time spacing and occurring in the time sequence in which they are named, the pulses $P_1$ and $P_3$ being interrogation pulses and the pulse $P_2$ being a sidelobe suppression pluse, said decoding apparatus comprising a pair of parallel channels, means for applying received interrogation pulses to said channels, one of said channels including an amplitude comparison means for preventing pulse $P_2$ from being passed if its amplitude is less than that of pulse $P_1$ by a predetermined amount whereby the output pulses of said one channel are distorted with respect to their original relative amplitudes, the second of said channels being non-distorting with respect to the relative amplitudes of said pulses, an amplitude comparison circuit to which the output pulses of said second channel are applied, said amplitude comparison circuit comprising means for comparing the amplitudes of said interrogation pulses and for producing an output pulse when said interrogation pulses have a predetermined amplitude relation, means for producing a coincidence output pulse when said interrogation pulses have a predetermined time spacing, said decoding apparatus having an output lead, means for normally supplying the output of said amplitude comparison circuit to said output lead in response to the occurrence of said coincidence output pulse, a suppression pulse generator to which the output of said one channel is applied, said generator including means for producing a suppression pulse when pulses $P_1$ and $P_2$ are supplied thereto with a predetermined time spacing, and means responsive to the production of said suppression pulse for preventing the output of said amplitude comparison circuit from being supplied to said output leads.

7. Decoding apparatus that is responsive to a three-pulse interrogation comprising three pulses $P_1$, $P_2$ and $P_3$ having a predetermined time spacing and occurring in the time sequence in which they are named and having a predetermined amplitude relation, said decoding apparatus comprising a pair of parallel channels, means for applying received interrogation pulses to said channels, one of said channels including an amplitude comparison means for preventing pulse $P_2$ from being passed if its amplitude is less than that of pulse $P_1$ by a predetermined amount and whereby the output pulses of said one channel are distorted with respect to their original relative amplitudes, the second of said channels being non-distorting with respect to the relative amplitudes of said pulses, an amplitude comparison circuit to which the output pulses of said second channel are applied, said amplitude comparison circuit comprising means for comparing the amplitudes of said interrogation pulses $P_1$ and $P_3$ for producing an output pulse when said pulses $P_1$ and $P_3$ have a predetermined amplitude relation, means for producing a coincidence output pulse when said interrogation pulses $P_1$ and $P_3$ have a predetermined time spacing, said decoding apparatus having an output lead, means for normally supplying the output of said amplitude comparison circuit to said output lead in response to the occurrence of said coincidence output pulse, a suppression pulse generator to which the output of said one channel is applied, said generator including means for producing a suppression pulse when pulses $P_1$ and $P_2$ are supplied thereto with a predetermined time spacing, and means responsive to the production of said suppression pulse for preventing the output of said amplitude comparison circuit from being supplied to said output lead.

8. In decoding apparatus for producing an output in response to the reception of a series of pulses having a predetermined time spacing and having a predetermined relative amplitude relation, the combination comprising a pair of parallel channels to which the received series of pulses are supplied, one of said channels including an amplitude comparison means of the type that distorts the amplitudes of the pulses with respect to their original relative amplitudes, the second of said channels being non-distorting with respect to the relative amplitudes of said pulses, a coincidence gate having a first input circuit and a second input circuit and having an output circuit and means for supplying the outputs of said one channel and said second channel to said first and second input circuits, respectively, of said coincidence gate whereby pulses from said second channel appear in said gate output circuit when and only when corresponding pulses are supplied simultaneously to said coincidence gate from said one channel, said coincidence gate being characterized in that it passes said pulses from said second input circuit to its output circuit without distortion of the relative amplitudes of said pulses.

9. In decoding apparatus for producing an output in response to the reception of a series of pulses having a predetermined time spacing and having a predetermined relative amplitude relation, the combination comprising a pair of parallel channels to which the received series of pulses are supplied, one of said channels including an amplitude comparison circuit of the ditch digging type whereby the output pulses of said one channel are distorted with respect to their original relative amplitudes, the second of said channels being non-distorting with respect to the relative amplitudes of said pulses, a coincidence gate having two input circuits and having an output circuit, and means for supplying the outputs of said two channels to the two input circuits, respectively, of said coincidence gate whereby pulses from said second channel appear in said gate output circuit when and only when corresponding pulses are supplied simultaneously to said coincidence gate from said one channel.

References Cited by the Examiner
UNITED STATES PATENTS
3,032,757    5/62    Majerns et al. _____ 343—6.8

CHESTER L. JUSTUS, *Primary Examiner.*